United States Patent [19]

Cody et al.

[11] Patent Number: 4,923,588

[45] Date of Patent: May 8, 1990

[54] WAX ISOMERIZATION USING SMALL PARTICLE LOW FLUORIDE CONTENT CATALYSTS

[75] Inventors: Ian A. Cody, Clearwater; David L. Brown, Ontario, both of Canada

[73] Assignee: Exxon Research and Engineering Company, Florham Park, N.J.

[21] Appl. No.: 285,462

[22] Filed: Dec. 16, 1988

[51] Int. Cl.$^5$ ............................................. C10G 69/02
[52] U.S. Cl. ........................................ 208/27; 208/46; 208/89; 585/737; 585/749
[58] Field of Search .................... 585/749, 737, 748; 208/27, 89, 46, 112

[56] References Cited

U.S. PATENT DOCUMENTS

| | | | |
|---|---|---|---|
| 2,668,790 | 2/1954 | Good et al. | 196/50 |
| 2,668,866 | 2/1954 | Good et al. | 585/749 |
| 2,779,713 | 1/1957 | Cole et al. | 196/35 |
| 2,817,693 | 12/1957 | Koome et al. | 585/749 |
| 2,838,444 | 6/1958 | Teter et al. | 196/50 |
| 2,914,464 | 11/1959 | Burton et al. | 208/138 |
| 3,078,323 | 2/1963 | Kline et al. | 585/749 |
| 3,121,696 | 2/1964 | Hoekstra et al. | 252/441 |
| 3,125,511 | 3/1964 | Tupman et al. | 208/264 |
| 3,206,525 | 9/1965 | Michales et al. | 585/749 |
| 3,268,439 | 8/1966 | Tupman et al. | 208/112 |
| 3,308,052 | 3/1967 | Ireland et al. | 208/27 |
| 3,365,390 | 1/1968 | Egan et al. | 208/60 |
| 3,486,993 | 12/1969 | Egan et al. | 208/89 |
| 3,487,005 | 12/1969 | Egan et al. | 208/59 |
| 3,629,096 | 12/1971 | Divijak | 208/89 |
| 3,709,817 | 1/1973 | Suggitt et al. | 208/112 |
| 3,711,399 | 1/1973 | Estes et al. | 208/112 |
| 3,717,586 | 2/1973 | Suggitt et al. | 252/439 |
| 3,794,580 | 2/1974 | Ladeur | 208/110 |
| 3,830,723 | 8/1974 | Ladeur et al. | 208/108 |
| 3,864,425 | 2/1975 | Gardner | 585/752 |
| 3,915,843 | 10/1975 | Franck et al. | 208/112 |
| 4,186,078 | 1/1980 | Itoh et al. | 208/27 |
| 4,263,127 | 4/1981 | Rausch et al. | 208/58 |
| 4,602,000 | 7/1986 | Dupin et al. | 502/332 |
| 4,695,365 | 9/1987 | Ackelson et al. | 208/89 |
| 4,832,819 | 5/1989 | Hamner | 585/748 |

FOREIGN PATENT DOCUMENTS

| | | | |
|---|---|---|---|
| 823010 | 11/1959 | United Kingdom | 585/749 |
| 848198 | 9/1960 | United Kingdom | 585/749 |
| 951997 | 3/1964 | United Kingdom | 585/749 |
| 1065205 | 4/1967 | United Kingdom | 585/749 |
| 1218920 | 1/1971 | United Kingdom | 585/749 |

*Primary Examiner*—Anthony McFarlane
*Attorney, Agent, or Firm*—Joseph J. Allocca

[57] ABSTRACT

Waxes, for example waxes obtained from dewaxing hydrocarbon oils, called slack waxes, and synthetic waxes such as those obtained by Fischer-Tropsch processes, are isomerized into oils boiling in the lube oil boiling range, e.g., 370° C.+, by contacting the wax under isomerization conditions and in the presence of hydrogen with an isomerization catalyst comprising a noble Group VIII metal on a small particle size refractory metal oxide support having a low total fluoride content catalyst wherein the total fluoride content is in the range of 0.1 to up to but less than 2 wt % fluoride and the support has a particle diameter of less than 1/16 inch. The small particle size refractory metal oxide support is preferably alumina or material containing alumina, preferably predominantly (i.e., >50%) alumina, more preferably an alumina such as gamma or eta. The most preferred alumina is 1/20 inch alumina trilobes. Noble metal content ranges from 0.1 to 2.0 wt %.

11 Claims, No Drawings

WAX ISOMERIZATION USING SMALL PARTICLE LOW FLUORIDE CONTENT CATALYSTS

DESCRIPTION OF THE INVENTION

The present invention is directed to a method for converting waxes, such as slack-waxes obtained by the dewaxing of hydrocarbon oils, or synthetic waxes obtained for example from Fischer-Tropsch synthesis processes, into liquid hydrocarbons boiling in the lube oil boiling range, e.g., 370° C.+. Conversion is accomplished by passing the wax over an isomerization catalyst comprising a noble Group VIII metal on a small particle size refractory metal oxide support having a low fluoride content in the presence of hydrogen under isomerization conditions. The catalyst has a fluoride content in the range of 0.1 to up to but less than 2.0 wt % fluoride, preferably 0.1 to 1.5 wt % fluoride, more preferably 0.2 to 1.0 wt % fluoride. The small particle size refractory metal oxide support is preferably alumina or material containing alumina, preferably predominantly (i.e., >50%) alumina, more preferably an alumina such as gamma or eta. The small particle size support has a particle diameter of less than 1/16 inch. The most preferred support material is 1/20 inch alumina trilobes. Noble metal content ranges from 0.1 to 2.0 wt %. Noble metals of choice include platinum and palladium.

The catalyst used in the present process is the subject of copending application, U.S. Ser. No. 07/285,437 filed even date herewith in the names of Cody and Brown.

As stated in that case, the catalyst is made by depositing the noble Group VIII metal on the small particle size refractory metal oxide support, calcining the metal loaded support and fluoriding the metal loaded support using a fluoriding source solution such as HF or $NH_4F$, preferably $NH_4F$, to a total fluoride level of 0.1 to up to but less than 2 wt %. As previously stated, the support is of small particle size, less than 1/16 inch in diameter.

The refractory metal oxide support is preferably alumina or material containing alumina, preferably predominantly (i.e., >50%) alumina, more preferably gamma or eta alumina, most preferably 1/20 inch alumina trilobes.

The noble Group VIII metal is deposited on the support by any convenient method such as soaking, spraying, incipient wetness, solution exchange, etc., followed by drying, typically conducted at 120° C. to 150° C., and calcination, typically conducted at 350° C. to 500° C., preferably 450° C. to 500° C., typically for from 1 to 5 hours. Suitable sources of noble Group VIII metal include chloroplatinic acid and fluoro platinic acid. Metal loading in from 0.1 to 2 wt %, preferably 0.1 to 1.0 wt %, most preferably 0.2 to 0.6 wt %. The preferred metal is platinum.

Following metal deposition, drying and calcination, the catalyst is fluorided. Total fluoride levels of 0.1 to up to but less than 2.0 wt % are produced using fluoride solution, e.g., HF or $NH_4F$ solutions, preferably aqueous $NH_4F$ solutions. Following fluoriding the catalyst is dried. Fluoriding is conducting using any convenient method such as soaking, spraying, incipient wetness, etc.

The small particle size catalyst is usually activated prior to use by heating in a hydrogen atmosphere (e.g., pure or plant hydrogen (i.e., ~60 to 70 vol % $H_2$)) to from 350° to 500° C. for from 1 to 48 hours or longer.

A typical hydrogen activation profile may be a period of 2 hours to go from room temperature to 100° C. with the catalyst being held at 100° C. from 0 to 2 hours, then the temperature is raised from 100 to about 350° to 500° C., preferably 350° to 450° C. over a period of 1 to 3 hours with a hold at the final temperature of from 1 to 4 hours. Alternatively, the catalyst can be hydrogen activated by heating from room temperature to the final temperature of 350° to 500° C. preferably 350° to 450° C. over a period of 2 to 7 hours with a hold at the final temperature of 0 to 4 hours. Similarly, hydrogen activation can be accomplished by going from room temperature to the final temperature of 350° to 500° C. preferably 350° to 450° C. in 1 hour.

The small particle size catalyst can be produced by starting with a small particle, one already smaller than 1/16 inch in diameter, preferably a 1/20 inch alumina trilobe and depositing the noble Group VIII metal and fluoride therein. Alternatively, a larger particle can be metal loaded and fluorided to the desired level, then crushed and sized to recover catalyst particles of less than 1/16 inch in diameter.

The wax is any readily available natural or synthetic wax. Natural waxes include those waxes obtained by dewaxing natural hydrocarbons, commonly called slack waxes. Slack waxes contain anywhere from 0 to 45% oil more typically 35% oil or less depending on the molecular weight of the oil being dewaxed to a specific pour point.

Slack waxes, coming from natural petroleum sources, contain numerous molecular species such as heteroatom compounds and polynuclear aromatic materials which are detrimental to the life and activity of isomerization catalysts. Thus, the heteroatoms should be removed prior to isomerization using a hydrotreating catalyst under mild hydrotreating conditions. Exemplary of hydrotreating catalysts are Ni/Mo on alumina, Co/Mo on alumina. Hydrotreating conditions are 250°–400° C.; 0.1–10 LHSV; 500 to 3000 psi $H_2$; 500–2000 SCF $H_2$/bbl. Following hydrotreating acceptable levels will be a nitrogen content of about 1–5 ppm, preferably 2 ppm and less and a sulfur content of about 1–20 ppm, preferably 5 ppm and less.

Synthetic waxes such as those obtained from Fischer-Tropsch synthesis processes can also be used as the wax feed to the isomerization process. Because such waxes are usually free of sulfur and nitrogen compounds, hydrotreating to remove S and N is not needed. Synthetic waxes, however, may contain other polar or oxygenated components and trace metals which should be removed prior to isomerization so that the resulting isomerate exhibits satisfactory daylight and oxidation stability. The waxes are also very high melting and should be softened somewhat to facilitate handling prior to isomerization. These two goals can be accomplished by treating the synthetic wax with a hydrotreating catalyst and hydrogen to reduce the oxygenate and trace metal levels of the wax and to partially hydrocrack/isomerize the wax to lighter and lower melting point materials. This pretreatment of synthetic Fischer-Tropsch waxes is one aspect of the invention taught in copending application, U.S. Ser. No. 07/283,643 filed 12/13/88 which is a CIP of U.S. Ser. No. 134,797 filed Dec. 18, 1987, in the names of Wachter, Boucher and Hamner.

Isomerization over the small particle size catalyst is conducted at a temperature of 300°–400° C., 500 to 3000 psi $H_2$; 1000–10,000 SCF/bbl, $H_2$, and 0.1–10.0 LHSV, preferably 320°–385° C., 1000–1500 psi $H_2$, and 1–2 V/V/hr.

An integrated process to produce lube base stock oils or blending stocks by isomerizing waxes is disclosed in copending application U.S. Ser. No. 07/283,664 filed Dec. 13, 1988, which is a continuation-in-part of Ser. No. 135,150, filed Dec. 18, 1987, in the names of Cody, Achia, Bell, West and Wachter.

The desired conversion of wax to a finished grade lube oil is dictated by two factors: (1) the ability of the dewaxing unit to process the unconverted wax remaining in the isomerate and (2) maximum production of dewaxed oil boiling in the lube oil range, e.g., about 330° C.+, preferably 370° C.+; thus high levels of conversion to non lube boiling range products are undesirable. Consequently, a balance must be struck between low conversions (favoring lubes production but sending too much residual wax to the dewaxer) and high conversion (sending law levels of wax to the dewaxer but producing fuels at the expense of lubes).

Following isomerization the isomerate is fractionated into a lubes cut and fuels cut, the lubes cut being identified as that fraction boiling in the 330°C.+ range, preferably the 370° C.+ range or even higher. The lubes fraction is then dewaxed to a pour point of about −21° C. or lower. Dewaxing is accomplished by techniques which permit the recovery of unconverted wax, since in the process of the present invention this unconverted wax is recycled to the isomerization unit. It is preferred that this recycle wax after the removal of the solvent used in the dewaxing operation be recycled to the isomerization reactor. A separate stripper can be used to remove entrained dewaxing solvent or other contaminants.

Solvent dewaxing utilizes typical dewaxing solvents such as $C_3 \propto C_6$ ketones (e.g., methyl ethyl ketone, methyl isobutyl ketone and mixtures thereof), $C_6$–$C_{10}$ aromatic hydrocarbons (e.g., toluene) mixtures of ketones and aromatics (e.g., MEK/toluene), autorefrigerative solvents such as liquified, normally gaseous $C_2$–$C_4$ hydrocarbons such as propane, propylene, butane, butylene, etc., at filter temperature of −25° to −30° C. It has been discovered that the preferred solvent to dewax the isomerate under miscible conditions and thereby produce the highest yield of dewaxed oil at a high filter rate is a mixture of MEK/MIBK (20/80 v/v) used at a temperature in the range of −25° to −30° C. Pour points lower than −21° C. can be achieved using lower filter temperatures and other ratios of said solvent. Further, when dewaxing isomerate made from a microwax, e.g., Bright Stock slack wax, it has been found to be preferred that the fraction of the isomerate which is dewaxed is the "broad heart cut" identified as the fraction boiling between about 330° to 600° C., preferably 370°–600° C. When processing wax fractions higher than 1050° F.+ the heavy bottoms fraction contains appreciable unconverted wax so they can be recycled to the hydrotreating unit.

It has also been found that prior to fractionation of the isomerate into various cuts and dewaxing said cuts, the total liquid product (TLP) from the isomerization unit can be advantageously treated in a second stage at mild conditions using the isomerization catalyst or a noble Group VIII on refractory metal oxide catalyst to reduce PNA and other contaminants in the isomerate and thus yield an oil of improved daylight stability. This aspect is covered in copending application, U.S. Ser. No. 07/283,659, filed Dec. 13, 1988, which is a continuation-in-part of U.S. Ser. No. 135,149, filed Dec. 18, 1987, in the names of Cody, MacDonald, Eadie and Hamner.

In that embodiment, the total liquid product is passed over a charge of the isomerization catalyst or over noble Group VIII on e.g. gamma alumina catalyst under mild conditions, e.g., a temperature in the range of about 170°–270° C., preferably about 180° to 220° C. at a pressure of about 300–1500 psi $H_2$, preferably about 500 to 1000 psi $H_2$, a hydrogen gas rate of about 500 to 10,000 SCF/bbl, preferably 1000 to 5000 SCF/bbl and a flow velocity of about 0.25 to 10 v/v/hr., preferably about 1–4 v/v/hr.

The total liquid product can be treated under these mild conditions in a separate, dedicated unit or the TLP from the isomerization reactor can be stored in tankage and subsequently passed through the isomerization reactor under said mild conditions. It has been found to be unnecessary to fractionate the total liquid product prior to this mild second stage treatment. Subjecting the whole TLP to this mild second stage treatment produces an oil product which upon subsequent fractionation and dewaxing yields a base oil exhibiting a high level of daylight stability and oxidation stability.

EXAMPLES

EXAMPLE 1

Five catalysts were prepared and compared for wax isomerization. Catalysts 1 and 2 were low fluoride content materials using 1/20 inch alumina trilobes as support. Catalyst 3 was a low fluoride content material which used a 1/16 inch extrudate as support. Catalysts 4 and 5 were high fluoride content materials which used 1/16 inch alumina extrudates and 1/20 inch alumina trilobes, respectively, as support. All of the catalysts were fluorided using aqueous $NH_4F$ solution, contained platinum as the catalytic metal component, and were calcined at 400° C. after fluorination. The catalysts were evaluated in a tubular reactor containing 200 cc of catalyst and wet feed introduced in an upflow mode.

The isomerization feed was a slack wax obtained from the dewaxing of a 600N oil. The slack wax contained about 20% oil in wax and was hydrotreated using commercial KF-840 catalyst (Ni/Mo alumina) to a sulfur level of <5 ppm and a nitrogen level of <1 ppm.

The results of isomerizing the wax using the five catalysts are summarized in Table 1.

TABLE 1

YIELD ADVANTAGES AT LOW FLUORIDE CONTENT AND SMALL PARTICLE SIZE

| Catalyst Composition | 1 | 2 | 3 | 4 | 5 |
|---|---|---|---|---|---|
| F, wt % | 0.93 | 0.5 | 0.42 | 7.0 | 6.7 |
| Pt, wt % | 0.3 | 0.3 | 0.3 | 0.58 | 0.62 |
| Particle Diameter (inch) | 1/20 | 1/20 | 1/16 | 1/16 | 1/20 |
| Shape[1] | T | T | E | E | T |
| Reaction Temp, °C.[2] | 355 | 370 | 380 | 320 | 330 |
| Pressure, psi $H_2$ | 1000 | 1000 | 1000 | 1000 | 1000 |
| LHSV, v/v/hr | 1.0 | 1.0 | 1.0 | 1.0 | 1.0 |
| Gas Rate, SCF/B | 2500 | 2500 | 2500 | 2500 | 2500 |
| 370° C. + Yield on feed, | 60 | 67 | 55 | 50 | 50 |

TABLE 1-continued

YIELD ADVANTAGES AT LOW FLUORIDE CONTENT AND SMALL PARTICLE SIZE

| Catalyst Composition | 1 | 2 | 3 | 4 | 5 |
|---|---|---|---|---|---|
| wt. %[3] | | | | | |

[1] E = extrudate, T = trilobe
[2] Temperature required for 70% conversion of wax in feed after 250 hours on stream
[3] Maximum once-through yield of 370° C.+ oil based on oil content determination using 100% MIBK From the above it is clear that isomerization using a catalyst having low fluoride content and small particle size, i.e., a particle size of less than 1/16 inch is superior as compared to isomerization using a catalyst having high fluorine contents or large particle size. Catalysts 1 and 2 which possess both low fluorine content and small particle size are superior to catalyst 3, which has low fluorine but larger particle size and to catalyst 5 which has small particle size but high fluorine and to catalyst 4 which had both high fluorine and larger particle size. Reference to catalyst 5 shows that possession of small particle size is not in itself sufficient to produce a catalyst of superior selectivity. Similarly reference to catalyst 3 shows that low fluorine control is also not in itself sufficient to produce a catalyst of superior selectivity. It is necessary that the catalyst possess both low fluorine and small particle size.

EXAMPLE 2

This example is offered to show that catalysts fluorided using aqueous $NH_4F$ solutions and having noble Group VIII metal are preferred Three catalysts were prepared on 1/16 inch extruder while this size base is not within the scope of this present invention, the example is offered to show that $NH_4F$ is the preferred fluoriding solution The feed is hydrotreated slack wax obtained by dewaxing 600N oil, and is the same as described in Example 1, but the test unit was smaller with only 80 cc of catalyst charge Feed was again introduced in an upflow mode. Experience has shown that yields obtained from the smaller charge are considerably lower than yields obtained from the larger unit of Example 1.

The results of isomerizing the wax using these three different catalyst are summarized in Table 2.

TABLE 2

$NH_4F$ TREATED CATALYST IS MORE ACTIVE THAN HF TREATED CATALYST

| | Catalysts[1] | | |
|---|---|---|---|
| | 6 | 7 | 8 |
| Metal, wt % | 0.3, Pt | 0.3, Pt | 2.0, Ni |
| F, wt % | 0.5 | 0.5 | 0.5 |
| Particle Size | 1/16" Extrudate | 1/16" Extrudate | 1/16" Extrudate |
| Source of Fluoride | HF (aq) | $NH_4F$ (aq) | $NH_4F$ (aq) |
| Conditions | | | |
| Temperature, °C. | 380 | 364 | 385 |
| Pressure, psi $H_2$ | 1000 | 1000 | 1000 |
| Space Velocity, v/v/hr | 0.9 | 0.9 | 0.9 |
| Gas Rate, SCF/B, $H_2$ | 5000 | 5000 | 5000 |
| Time on Stream, hour | 80 to 81 | 102 to 104 | 65 to 66 |
| 370° C.+ Yield on feed, wt. %[2] | 52.9 | 52.2 | 40.6 |
| 370° C.− | 28.5 | 23.5 | 27.9 |

[1] All catalyst 1/16" extrudates
[2] Maximum once-through yield of 370° C.+ oil based on oil content determination using 100% MIBK Catalysts 6 and 7 both contained the same level of fluoride loading (0.5 wt %) and the same amount of platinum (0.3 wt %). The only difference in their preparation was the type of fluoride source used. Catalyst 6 was fluorided using aqueous HF while catalyst 7 was fluorided using aqueous $NH_4F$. Both catalyst were run to produce maximum yields of 370° C.+ oil. Both catalysts produced approximately the same amount of such oil (52.9% for catalyst 6 and 52.2% for catalyst 7) but catalyst 6, made using HF was 16° C. less active than catalyst 7, made using $NH_4F$. From this it is clear that catalyst made using $NH_4F$ as the fluoriding solutions are preferred.

Likewise, review of catalyst 8 wherein the catalytic metal is nickel shows that noble Group VIII metals are the metals of choice in preparing the wax isomerization catalysts of the present invention.

We claim:

1. A method for the isomerization of waxes into liquid hydrocarbons comprising passing the wax to be isomerized in the presence of hydrogen and under isomerization conditions over an isomerization catalyst comprising a noble Group VIII metal on small particle size, fluorided, refractory metal oxide wherein the catalyst possesses a fluoride content in the range of 0.1 to up to but less than 2.0 wt % and the small particle size refractory metal oxide has a particle diameter of less than 1/16 inch.

2. The method of claim 1 wherein the fluoride content is in the range 0.1 to 1.5 wt %.

3. The method of claim 2 wherein the fluoride content is in the range 0.2 to 1.0 wt %.

4. The method of claim 1, 2 or 3 wherein the small particle size refractory metal oxide is selected from alumina or material containing alumina.

5. The method of claim 4 wherein the refractory metal oxide is alumina.

6. The method of claim 1, 2 or 3 wherein the Group VIII noble metal is platinum or palladium.

7. The method of claim 4 wherein the Group VIII noble metal is platinum or palladium.

8. The method of claim 5 wherein the Group VIII noble metal is platinum or palladium.

9. The method of claim 1, 2 or 3 wherein the small particle size refractory metal oxide is 1/20 inch alumina trilobes.

10. The method of claim 6 wherein the small particle size refractory metal oxide is 1/20 inch alumina trilobes.

11. The method of claim 1 wherein the wax is hydrotreated prior to being passed over the isomerization catalyst.

* * * * *